US005260699A

United States Patent [19]

Lister et al.

[11] Patent Number: 5,260,699

[45] Date of Patent: Nov. 9, 1993

[54] FERROELECTRIC LIQUID CRYSTAL DEVICES

[75] Inventors: Stephen J. S. Lister; Colin T. H. Yeoh, both of London; Alan Mosley, Berkhamsted, all of England

[73] Assignee: GEC—Marconi Limited, England

[21] Appl. No.: 766,812

[22] Filed: Sep. 26, 1991

[30] Foreign Application Priority Data

Oct. 1, 1990 [GB] United Kingdom ................ 9021346

[51] Int. Cl.[5] ................................ G09C 3/36

[52] U.S. Cl. ................................ 345/97; 359/55; 359/56; 359/84; 359/85

[58] Field of Search ................ 340/784; 359/55, 56, 359/84, 85

[56] References Cited

U.S. PATENT DOCUMENTS 4,909,607 3/1990 Ross ................ 340/784 X
4,927,243 5/1990 Taniguchi et al. ........ 340/784 X

FOREIGN PATENT DOCUMENTS 0306203 3/1989 European Pat. Off. .
0322022 6/1989 European Pat. Off. .
0337780 10/1989 European Pat. Off. .
2173336 10/1986 United Kingdom .
2208559 4/1989 United Kingdom .

OTHER PUBLICATIONS

"Electro optic pulse response of ferroelectric liquid crystals", by F. C. Saunders et al., in Liquid Crystals, 1989, vol. 6, No. 3, pp. 341-347.

*Primary Examiner*—Ulysses Weldon
*Attorney, Agent, or Firm*—Kirschstein et al.

[57] ABSTRACT

In a method of driving a ferroelectric liquid crystal display, a blanking pulse of width $2t_s$ followed, after a delay of $n \cdot t_s$ (where n is an integer), by a writing pulse of width $t_s$ and of opposite polarity to the blanking pulse are applied to successive row address lines at intervals of $2t_s$. Pairs of bipolar data pulses of width $t_s$ are applied to column address lines so that the data pulses coincide with the blanking pulse applied to the ith row and the writing pulse applied to row i-(n+1)/2 for odd values of n and to row 1-(n+2)/2 for even values of n. The data pulse amplitude may be varied in order to obtain variable grey levels in the display.

12 Claims, 9 Drawing Sheets

0v
ROW i
ROW i+1
$V_B$
$V_G$
$V_W$
2ts
ts
54
55
56
57
58
59
60
61
62
63
64
FRAME TIME = (2ts × NUMBER OF ROWS) + 10ts
NON SELECT
SELECT
$V_D$
$-V_D$
FOR ROW i

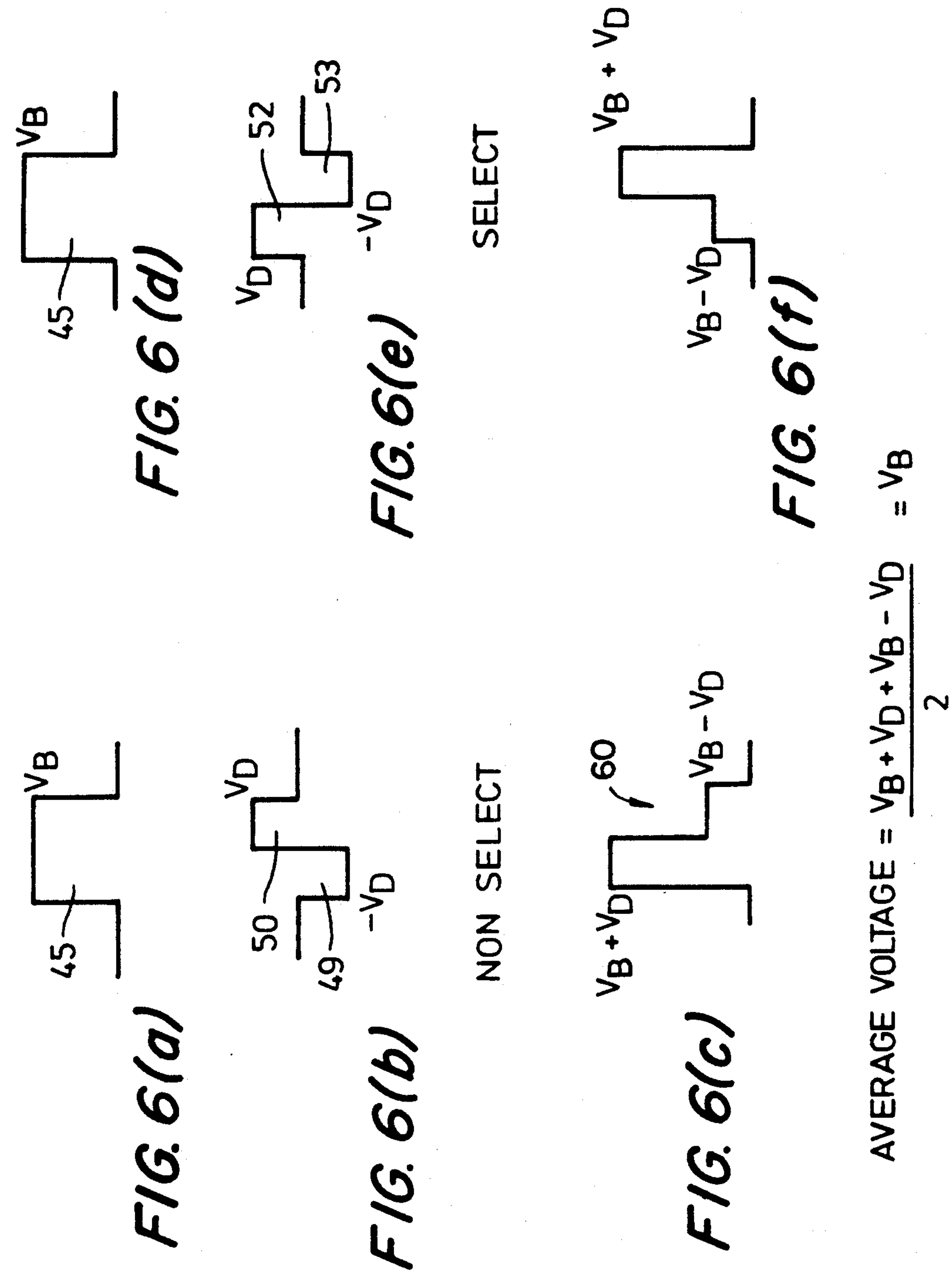
$$\text{AVERAGE VOLTAGE} = \frac{V_B + V_D + V_B - V_D}{2} = V_B$$

FERROELECTRIC LIQUID CRYSTAL DEVICES

BACKGROUND OF THE INVENTION

1. Field of the Invention

This invention relates to ferroelectric liquid crystal (FLC) devices, and particularly to a method and apparatus for driving the liquid crystal elements of such devices.

2. Description of Related Art

A ferroelectric liquid crystal has a permanent electric dipole which interacts with the applied electric field. Hence, ferroelectric liquid crystal elements exhibit fast response times, which make them suitable for use in display, switching and information processing applications. In particular, FLC displays will provide important alphagraphic flat panel displays for office applications.

The stimulus to which the FLC element responds is a dc field, and its response is a function of the applied voltage (V) and the length of time (t) for which the voltage is applied. The element is switched to one state by the application of a voltage of a given polarity across its electrodes, and is switched to the other state by the application thereto of a voltage of the opposite polarity. It is essential that an overall dc voltage shall not be applied across such an element for an appreciable period, so that the elements remain charge-balanced, thereby avoiding decomposition of the liquid crystal material. Pulsed operation of such elements has therefore been effected, with a pulse of one polarity being immediately followed by a pulse of the other polarity, so that there is no resultant dc polarisation.

The liquid crystal elements are commonly arranged in matrix formation and are operated selectively by energising relevant row and column lines. Time-division multiplexing is effecting by applying pulses cyclically to the row (strobe) lines in sequence and by applying pulses, in synchronism therewith, to the column (data) lines.

It is known that the electronic waveforms used to drive a ferroelectric liquid crystal display (FLCD) affect greatly the contrast ratio and the frame time of such a display. Hence, these waveforms will have a great impact on the commercial exploitation of ferroelectric LCDs.

FIGS. 1(*a*), 1(*b*) and 1(*c*) of the accompanying drawings illustrate the waveforms occurring in one known FLCD drive scheme. FIG. 1(*a*) shows the waveform for one row of devices of the display. The waveform 1 comprises a positive pulse 2 of amplitude $V_s$ followed immediately by a negative pulse 3 of the same amplitude. After a delay 4, a further negative pulse 5 of amplitude $V_s$ is followed immediately by a positive pulse 6 of amplitude $V_s$. FIG. 1(*b*) shows a corresponding section of a "non-select" column waveform 7. That section comprises a positive pulse 8 of amplitude $V_D$ immediately followed by a negative pulse 9 and, after a delay 10, a negative pulse 11 immediately followed by a positive pulse 12. The pulses 9, 11 and 12 are all of amplitude $V_D$. The pulses 8, 9, 11 and 12 are of the same width as, and are synchronized with, the pulses 2, 3, 5 and 6. Corresponding column waveform sections for the other rows will occur during the delay period 10. Alternatively, a corresponding section of a "select" column waveform 13 comprises pulses 14–17 of the opposite polarities to the pulses 8, 9, 11 and 12. This scheme uses two sets of bipolar pulses to achieve the desired switching and is, therefore, called a "four-slow" scheme. It is now known that that scheme gives rise to low contrast and long frame times. The frame time is given by the pulse width ($t_{s1}$) × number of slots × number of rows in the display. The frame time can be halved by splitting the column electrodes in half and driving the resulting two sets of row electrodes in parallel.

A much reduced frame time can be achieved by using a "two-slot" scheme as disclosed in our British Patent Publication No: 2,208,559A, which scheme is illustrated in FIG. 2 of the present drawings. In this case the strobing (row) signal (FIGS. 2(*a*), 2(*b*), and 2(*c*)) comprises a positive pulse 20 of amplitude $V_s$, followed by a negative pulse 21 of amplitude $V_s'$, which is less than $V_s$. This is the only pair of strobe pulses occurring during a frame period. The corresponding data (column) signal section comprises either a positive pulse 22 followed by a negative pulse 23 (FIG. 2(*b*)) or a negative pulse 24 followed by a positive pulse 25 (FIG. 2(*c*)), depending upon the data to be written. The pulses 22–25 are all of amplitude $V_D$ (not necessarily equal to $V_D$ of FIG. 2). The width of each pulse is $t_{s2}$.

Since the strobe pulses 20 and 21 are of different amplitudes, there would be a residual dc level applied to the addressed liquid crystal elements and, as stated above, this is undesirable. A small dc voltage $V_G$ is therefore applied to the strobe line between the end of the pulse 21 and the beginning of the pulse 20 of the next frame period. The required voltage $V_G$ is given by $$V_G = \frac{V_S - V_S'}{N}$$

where N is the number of rows.

Although the known scheme of FIGS. 2(*a*), 2(*b*) and 2(*c*) can have half the frame time of the FIGS. 1(*a*), 1(*b*) and 1(*c*) scheme, the contrast ratio achieved by the FIGS. 2(*a*), 2(*b*) and 2(*c*) scheme is generally similar to that obtained by the FIGS. 1(*a*), 1(*b*) and 1(*c*) and can be low, for example ≦5:1.

A further known scheme is illustrated in FIGS. 3(*a*), 3(*b*) and 3(*c*) of the drawings. In this case the strobe signal 30 (FIG. 3(*a*)) comprises a negative pulse 31 of amplitude $V_s$ and a positive pulse 32 also of amplitude $V_s$. The corresponding "non-select" column signal section 33 (FIG. 3(*b*)) comprises a negative pulse 34 occurring just before the pulse 31, immediately followed by a positive pulse 35 aligned with the pulse 31. A positive pulse 36 is then followed immediately by a negative pulse 37 aligned with the pulse 32. The "select" column signal section 38 (FIG. 3(*c*)) comprises pulses 39–42 aligned with, but of opposite polarity to, the pulses 34–37, respectively. All of the pulses 34–37 and 39 to 42 are of amplitude $V_D$ (not necessarily equal to $V_D$ of FIGS. 1(*a*), 1(*b*) and 1(*c*) of FIGS. 2(*a*), 2(*b*) and 2(*c*), and each of these pulses, as well as each of the pulses 31 and 32, is of width $t_{s3}$.

If the schemes of FIGS. FIGS. 1(*a*)-1(*c*), FIGS. 2(*a*-)-2(*c*) and FIGS. 3(*a*)-3(*c*) are compared, it is found that $t_{s1} \approx t_{s2} \approx t_{s3}$. The scheme of FIGS. 3(*a*), 3(*b*) and 3(*c*) therefore operates with short pulse width and has the advantages of short switching times and high contrast ratio, but the disadvantages of being a four-slot scheme, which leads to a long frame time.

The known schemes can therefore achieve either a high contrast ratio or a short frame time, but none can achieve both of these desirable features together.

SUMMARY OF THE INVENTION

It is an object of the present invention to provide an improved method and apparatus for driving ferroelectric liquid crystal devices by which both a relatively high contrast ratio and a relatively short frame time can be achieved.

According to one aspect of the invention there is provided a method of driving, in a time-division multiplex mode, a display comprising a matrix of rows and columns of ferroelectric liquid crystal elements, wherein a blanking voltage pulse of amplitude $V_B$ and pulse width $2t_s$ following, after a delay of $n \times t_s$ (where n is an integer), by a writing voltage pulse of amplitude $V_W$, of width $t_s$ and of opposite polarity to the blanking voltage pulse are applied to successive rows at intervals of $2t_s$; and pairs of bipolar data pulses of amplitude $|V_D|$ selected from a range including zero and such that said data pulses coincide with the blanking pulse for the ith row and the writing pulse applied row $i-(n+1)/2$ for odd values of n and to row $i-(n+2)/2$ for even values of n.

According to another aspect of the invention there is provided apparatus for driving, in a time-division multiplex mode, a display comprising a matrix of rows and columns of ferroelectric liquid crystal elements, the apparatus comprising means to apply to successive rows of said elements at intervals of $2t_s$ a blanking voltage pulse of amplitude $V_B$ and pulse width $2t_s$ and, after a delay of $n \times t_s$ (where n is an integer), a writing voltage pulse of amplitude $V_W$, of width $t_s$ and of opposite polarity to the blanking voltage pulse; and means to apply to column address lines pairs of bipolar data pulses of amplitude $|V_D|$ selected from a range including zero and each pulse being of pulse width $t_s$, such that said data pulses coincide with the blanking pulse for the ith row and the writing pulse applied to row $i-(n+1)/2$ for odd values of n and to row $i-(n+2)/2$ for even values of n.

BRIEF DESCRIPTION OF THE DRAWINGS

Embodiments of the invention will now be described, by way of example, with reference to the accompanying drawings, in which FIGS. 1(*a*), 1(*b*) and 1(*c*); 2(*a*), 2(*b*) and 2(*c*); and 3(*a*), 3(*b*) and 3(*c*) illustrate known drive schemes as described above, FIGS. 4(*a*), 4(*b*) 4(*c*), 4(*d*), (4*e*) and 4(*f*) illustrates waveforms occurring in a first scheme in accordance with the invention, FIGS. 5(*a*), 5(*b*), 5(*c*) and 5(*d*) illustrate waveforms occurring in an alternative scheme in accordance with the invention, FIGS. 6(*a*), 6(*b*), 6(*c*) and 6(*d*), 6(*e*) and 6(*f*) illustrates waveforms resulting from the simultaneous application of blanking and data pulses.

DETAILED DESCRIPTION OF THE PREFERRED EMBODIMENTS

Figures 4A, 4B, 4C, 4D, 4E, 4F:
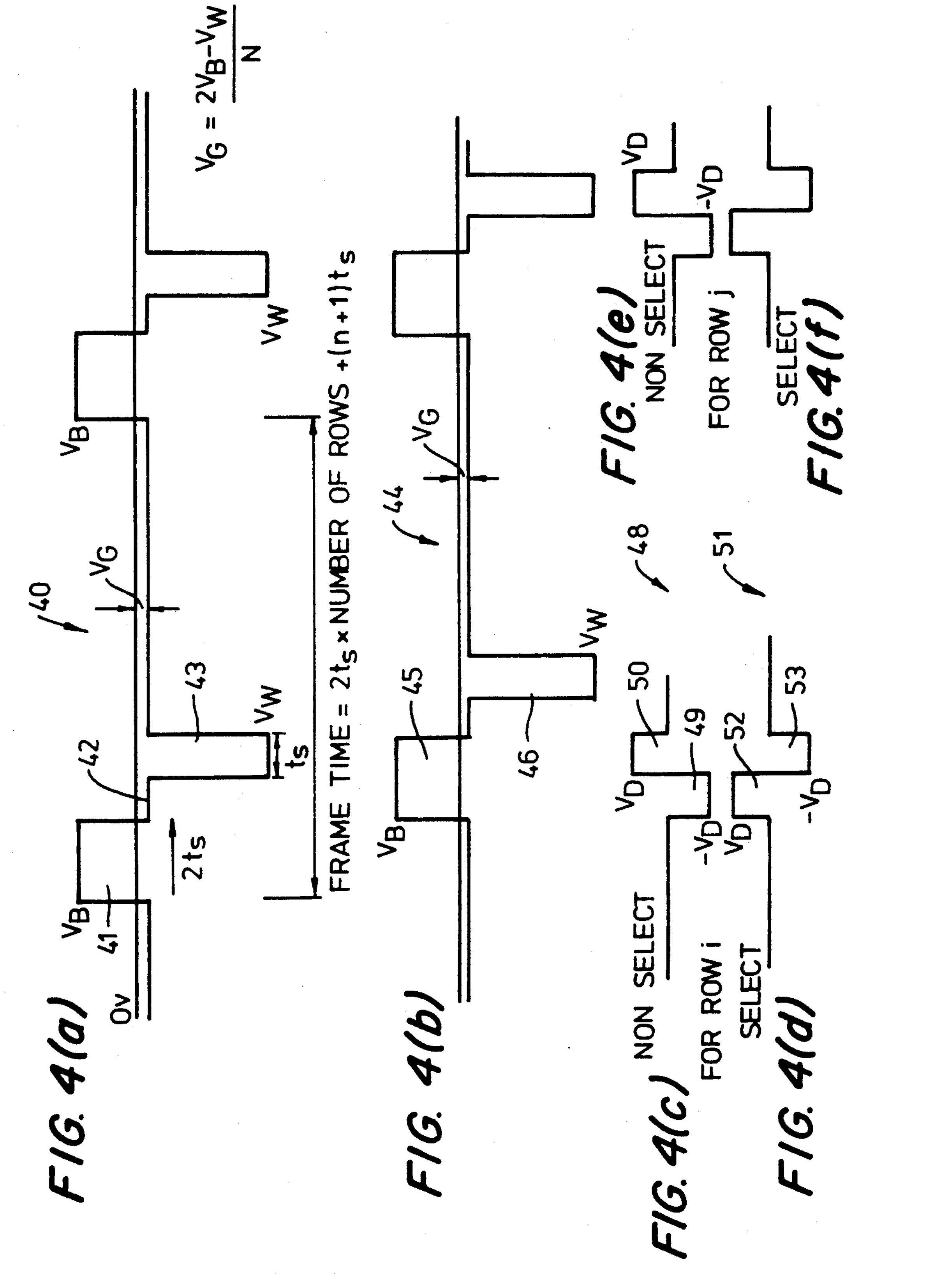

Referring to FIG. 4(*a*) of the drawings, in a first drive scheme in accordance with the invention a strobe signal 40 (FIG. 4(*a*)) for an "ith" row comprises a positive blanking pulse 41 of width $2t_s$ and amplitude $V_B$ followed by a delay period 42 of $t_s$ and then a negative write pulse 43 of width $t_s$ and amplitude $V_w$. These pulses are repeated after a frame time given by $2t_s \times$ number of rows $(N)+(n+1)t_s$ where n is the number of time slots. In the illustrated case $n=1$. The pulses are offset by a dc level $V_G$ where $V_C$ is given by $$V_G = \frac{2V_B - V_w}{N}$$

For the "jth" row the strobe signal 44 (FIG. 4(*b*)) comprises a pair of pulses 45, 46 identical to the pulses 41, 43, respectively, but delayed by a period $2t_s$ relative to those pulses.

The column "non select" signal 48 (FIG. 4(*c*)) for the ith row comprises a negative pulse 49 immediately followed by a positive pulse 50. The pulse 49 occurs in the period 42 between the blanking pulse 41 and the write pulse 43 for the ith row. The pulse 50 is aligned temporarily with the write pulse 43. The "select" column signal 51 (FIG. 4(*d*)) comprises pulses 52 and 53 identical in width and timing to, but of opposite polarity to, the pulses 49 and 50. All of the pulses 49, 50, 52 and 53 are preferably of amplitude $|V_D|$ and of duration $t_s$, as shown but, alternatively, the "select" pulses may be of different amplitude from the "non-select" pulses. A zero d.c. level might alternatively be used for either the "select" or the "non-select"signal.

The driving signals of the present invention are characterised by a row blanking pulse of amplitude $V_B$ and width $2t_s$; a writing pulse of width $t_s$; a spacing of n time slots, i.e. $n \times t_s$, where n is an integer $\geqq 1$, between the blanking pulse and the write pulse; and the write pulse for the ith row overlaps with the blanking pulse of the jth row, where $j=i+(n+1)/2$ for odd values of n and $j=i+(n+2)/2$ for even values of n. Similarly, considering the row before the ith row, i.e. the row $i-(n+1)/2$ for odd values of n and the row $n-(n+)/2$ for even values of n, the data pulses for the previous row coincide with the blanking pulse for the ith row and with the writing pulse for the previous row. In the case of the FIGS. 4(*a*)–4(*e*) embodiment, $n=1$ i.e. the period 42 is $t_s$, as mentioned above.

Figures 5A, 5B, 5C, 5D:
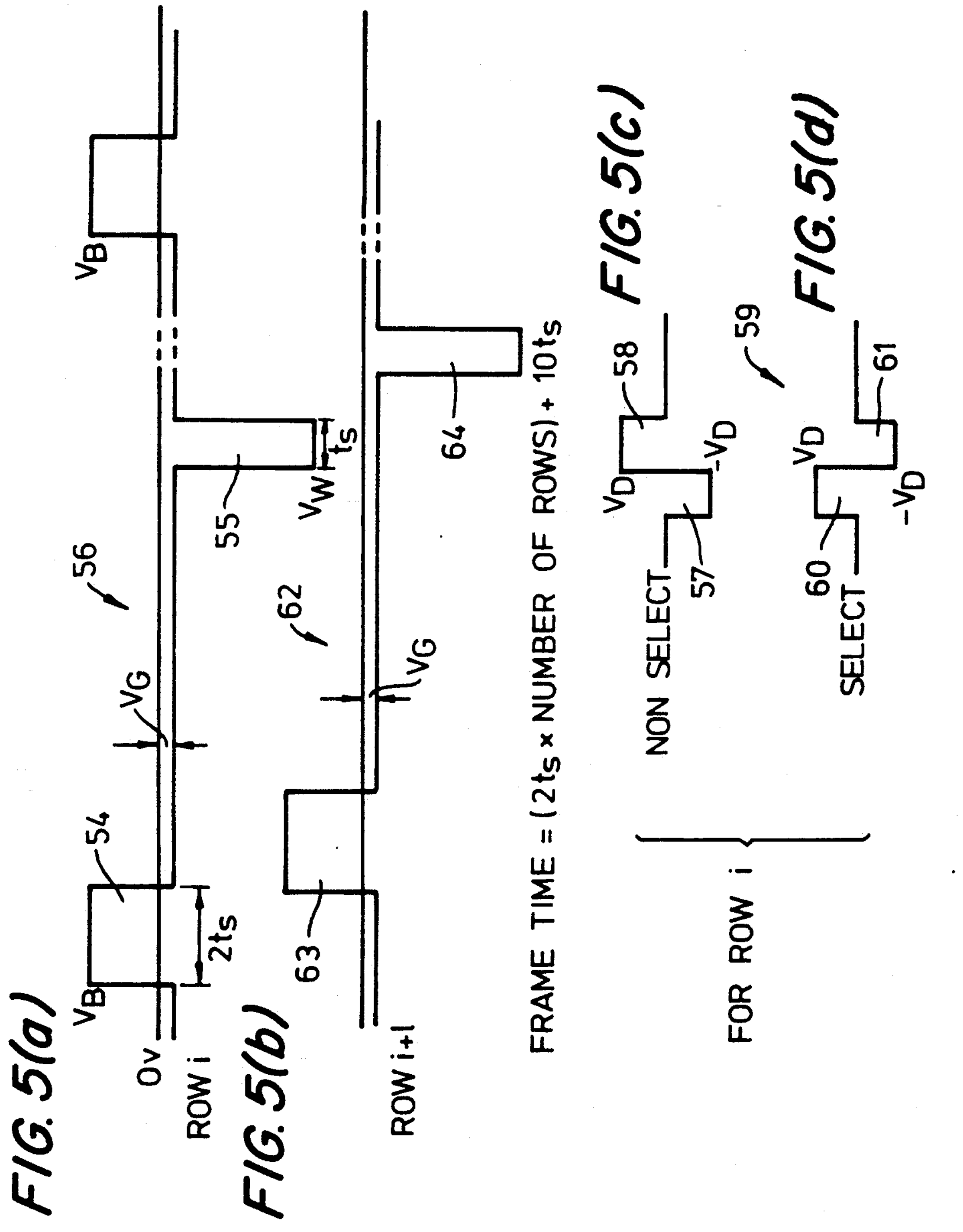

FIGS. 5(*a*)–(*d*) illustrate the corresponding waveforms for $n=9$, i.e. there is a delay of $9t_s$ between the blanking pulse 54 and the write pulse 55 of the ith row line drive signal 56. As in FIG. 4, the non-select column waveform (FIG. 5(*c*)) comprises a negative pulse 57 followed by a positive pulse 58 temporarily aligned with the write pulse 55. The select column waveform 59 (FIG. 5(*d*)) comprises pulses 60, 61 of the opposite polarities to the pulses 57, 58, respectively. The strobe signal 62 (FIG. 5(*b*)) for the $(i+1)$th row comprises a blanking pulse 63 having its leading edge coincident with the trailing edge of the pulse 54 and a negative write pulse 64 spaced from the pulse 63 by a period $9t_s$. There is therefore a time delay of $2t_s$ between the pulses 55 and 64. In this embodiment, the frame time is given by $(2t_s \times N)+10t_s$.

In the strobe signals 40 and 56 of FIGS. 4(*a*) and 5(*a*) the waveforms are offset by a dc voltage $V_G$ in order to account for the different in blanking and write pulse amplitudes and widths, so as to avoid an overall dc unbalance, as explained previously.

FIGS. 5(*a*)-(*f*) show the effect of the application of the column "non-select" data pulses 49,50 (FIG. 6(*b*)) for row i on the simultaneously-applied blanking pulse 45 for row j. The resultant waveform 60 is shown in FIG. 6(*c*). Waveforms occurring for the column "select" data pulses 52,53 are shown in FIGS. 6(*d*),(*e*) and (*f*). It will be seen that the data pulses merely modify the shape of the waveform and do not alter the magnitude of the average voltage and, therefore, do not affect the effective drive voltage of the blanking pulse.

Figure 7:
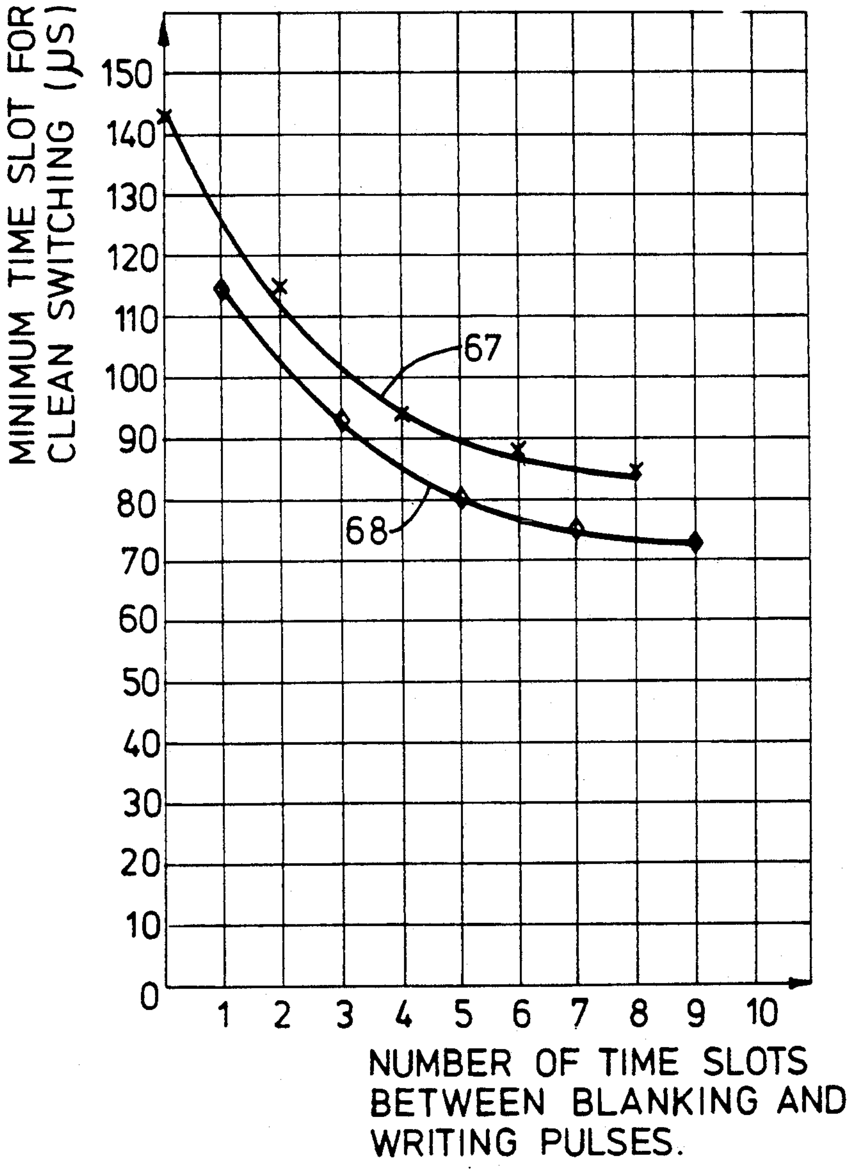
FIG. 7 shows curves of minimum time slot length for proper switching of FLC elements against number of time slots between the blanking and data pulses.

FIG. 7 shows two curves 67,68 of minimum acceptable pulse width against number of time slots (n) between the row blanking pulse and the write pulse, where n is in a range from 0 to 10 inclusive. The curve 67 relates to even numbers of time slots, whereas the curve 68 relates to odd numbers of time slots. It will be seen that both curves flatten out for increasing numbers of time slots, so that little improvement in pulse width reduction is achieved by increasing n beyond 9. Furthermore, it is found that better performance in terms of pulse width reduction is obtained by using an odd number of time slots rather than an even number. This is considered to be due to a disruptive influence produced by the trailing half of the bipolar data pulse which comes after the writing pulse for even values of n.

The optimum values of $V_B$, $V_W$ and $V_D$ will depend on the ferroelectric liquid crystal material and the cell technology employed. It is preferable that $V_B$, $V_W$ and $V_D$ should be variable independently of each other. However, if $2V_B=V_D$ then $V_G=0$, i.e. no voltage offset is required. Furthermore, the use of voltage levels such that $4V_D=2V_B=V_W$ in a bilevel display with no grey levels can provide acceptable performance and has the significant advantage that only two variables i.e. $V_D$, $V_B$ or $V_W$ and $t_s$ need to be adjusted to drive the display rather than five variables, i.e. $V_D$, $V_B$, $V_W$, $V_G$ and $t_s$.

Figures 1A, 1B, 1C:
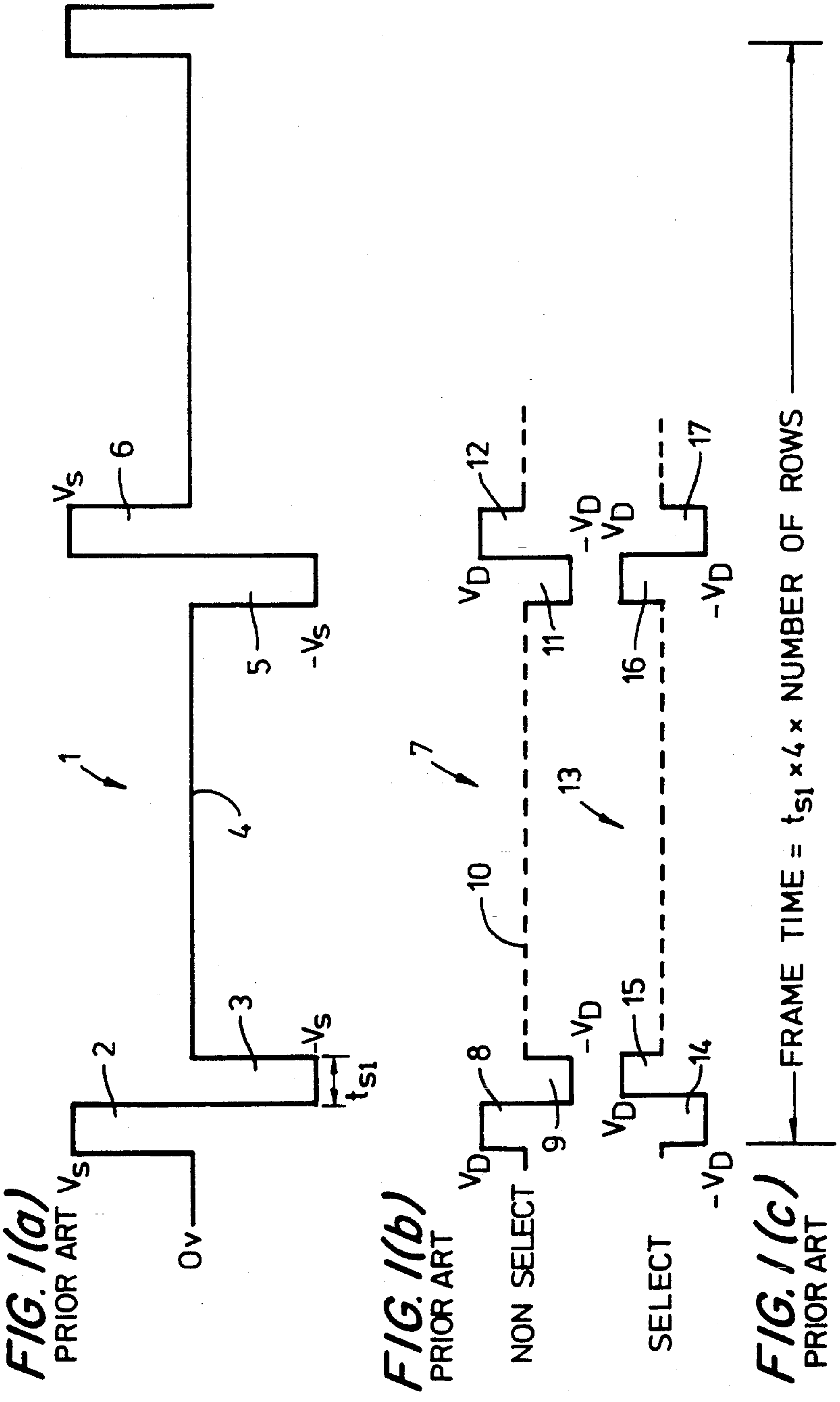
FIG. 1(a) PRIOR ART
FIG. 1(b) PRIOR ART
FIG. 1(c) PRIOR ART
Figures 2A, 2B, 2C:
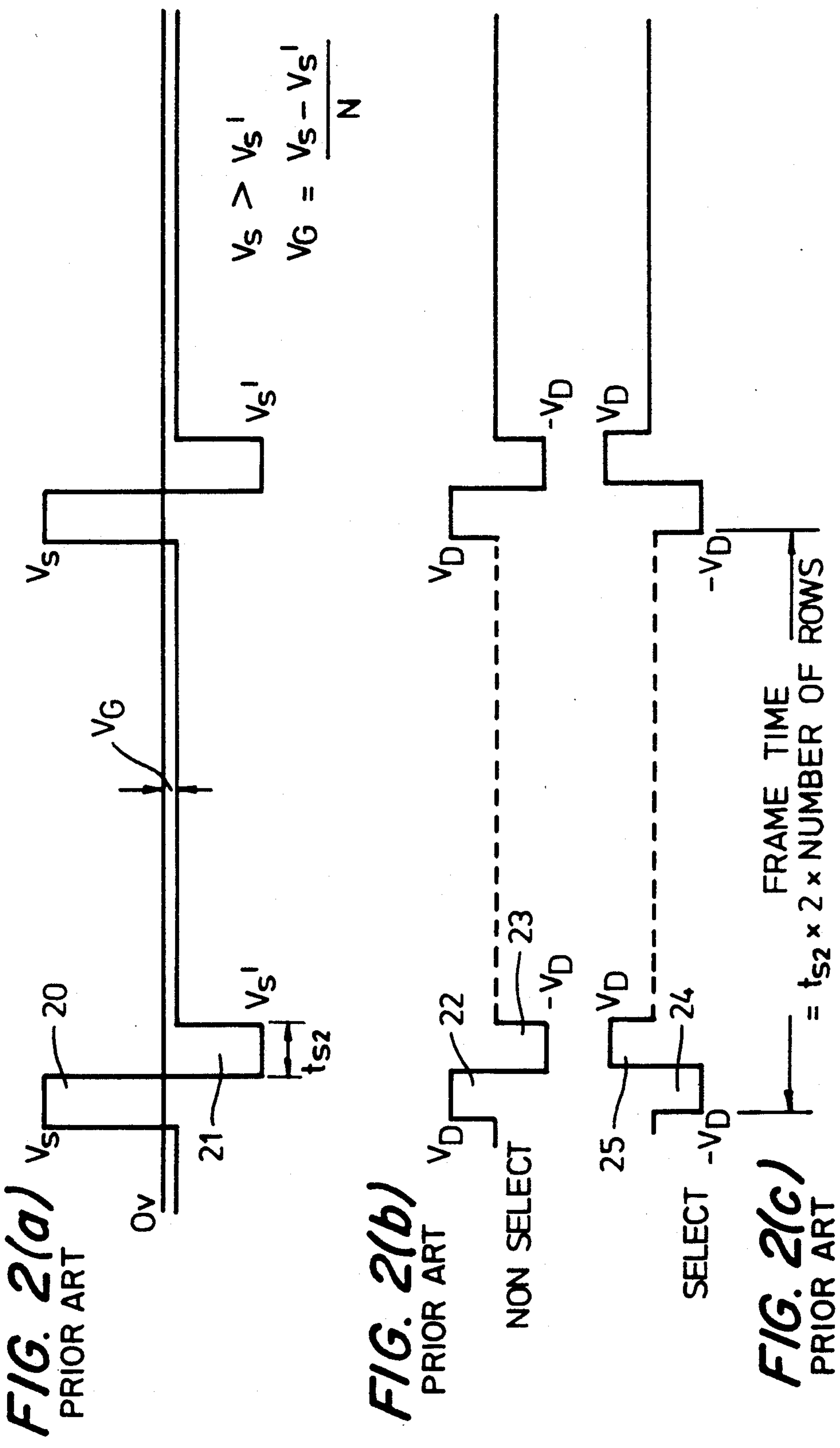
FIG. 2(a) PRIOR ART
FIG. 2(b) PRIOR ART
FIG. 2(c) PRIOR ART
Figures 3A, 3B, 3C:
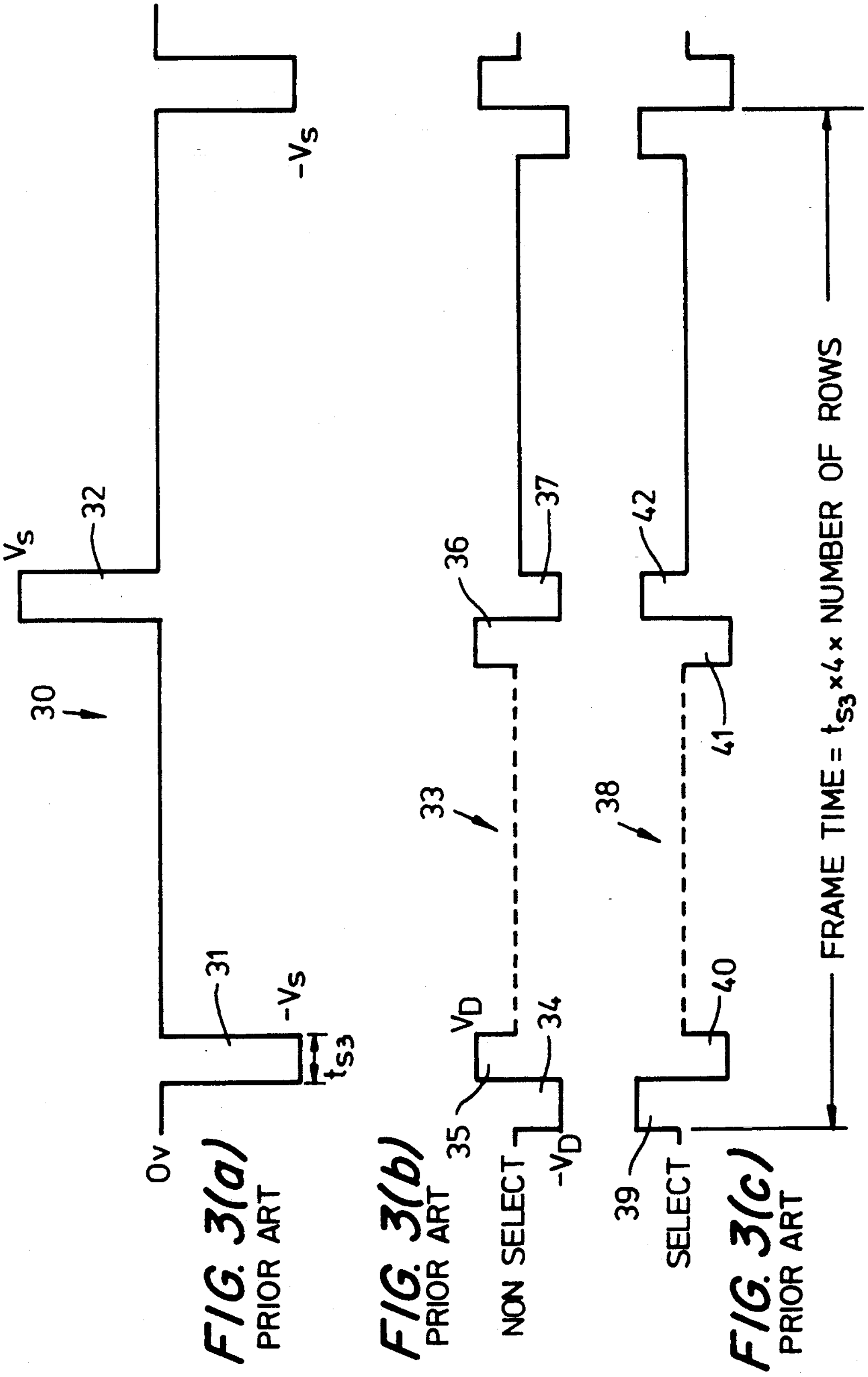
FIG. 3(a) PRIOR ART
FIG. 3(b) PRIOR ART
FIG. 3(c) PRIOR ART

Typical values for $V_D$, $V_B$, $V_W$, $t_s$ and n for a 2 μm ferroelectric liquid crystal display containing a ferroelectric liquid crystal known as SCE8 supplied by BDH Ltd., Poole, England are 10 V, 20 V, 40 V, 80 μs, and 9 respectively. This combination provides a contrast ratio of 8:1 and a frame time of 83.4 ms for a display containing 516 lines. If the column electrodes are split and the rows are driven in parallel as two pairs of 256 lines, then the frame time can be reduced to 41.8 ms. Similar contrast ratios and values of $t_s$ are achieved with the known scheme of FIG. 3, but the frame time of the latter scheme is almost twice as long at 165.1 ms.

If $2V_B \neq V_W$ then a dc offset $V_G$, given by $V_G=(2V_B-V_W)N$, where N=the number of rows, should be applied. Alternatively, the polarities of $V_B$ and $V_W$ can be reversed at every frame, thereby cancelling any dc affects. The latter is less desirable, because it can lead to reduced contrast ratios, for example when the blanking pulse $V_B$ produces a bright state and the pixel is to be 'written' into a dark state. Furthermore, in order to avoid similar problems, it is preferably that the blanking pulse $V_B$ always produces a dark state rather than a light state in the instances when $2V_B=V_W$ or when an offset voltage $V_G$ is employed.

Figure 8:
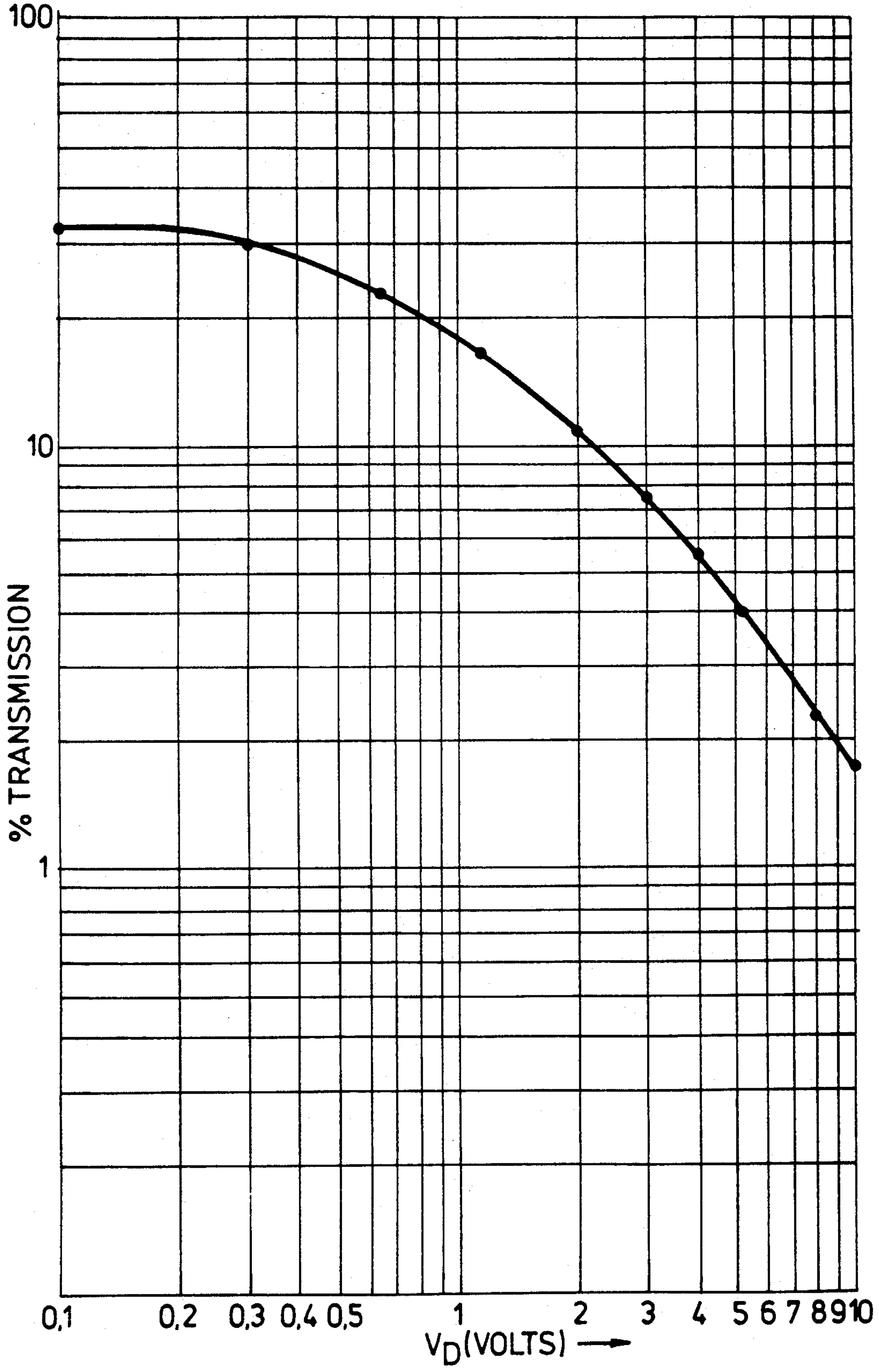
FIG. 8 shows a curve of light transmission through an FLC display against the amplitude $V_D$ of the pairs of bipolar data pulses.

FIG. 8 shows a graph of light transmission through a written pixel of the FLC display for varying values of $|V_D|$, the amplitude of the bipolar data pulses. The variation in light transmission enables a number of grey levels to be produced in the display. For example, the maximum contrast ratio of 18.8 shown in FIG. 8 would allow nine grey levels to be obtained by selecting values of $|V_D|$, where the contrast ratio increases by a factor of $\sqrt{2}$ from one grey level to the next.

The addressing schemes in accordance with the present invention, such as those illustrated in FIGS. 4(*a*)-(*e*) and 5(*a*)-5(*d*) and described herein, provide high contrast ratios and short slot times. In addition, due to their advantage of being two-slot schemes, they produce short frame times. Each of these factors is advantageous to the commercial exploitation of a ferroelectric liquid crystal display.

Figure 9:
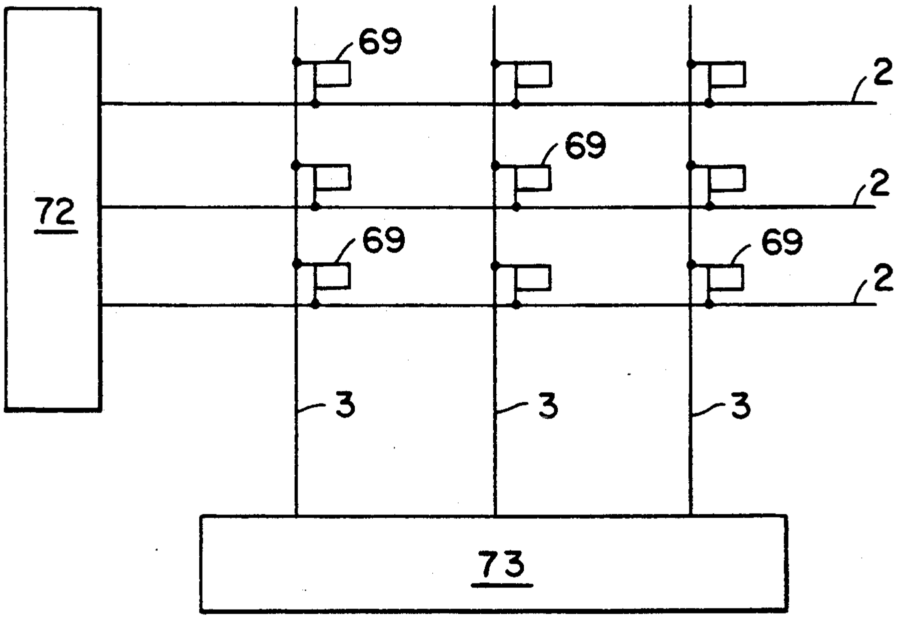
FIG. 9 illustrates, schematically, drive lines and drive circuits for an FLC drive system incorporating the present invention.

FIG. 9 illustrates, schematically, the drive lines and drive circuits for a typical ferroelectric liquid crystal display. The display comprises a matrix of ferroelectric liquid crystal elements 69 coupled to row (strobe) and column (data) lines 70 and 71, respectively. For the sake of example, nine of such elements coupled to three strobe lines and three data lines are shown, but there may be any desired number of elements and corresponding lines. A strobe pulse generator 72 is coupled to the strobe lines, and a data pulse generator 73 is coupled to the data lines. The strobe pulse generator applies strobing signals to the strobe lines 70 in sequence, and the data pulse generator applies data signals to the data lines 71, in synchronism with the pulsing of the strobe lines, to set the corresponding element 69 in the required state, the strobing signals and the data signals being in accordance with the invention, as described above.

We claim:

1. A method of driving, in a time-division multiplex mode, a display comprising a matrix of rows and columns of ferroelectric liquid crystal elements, comprising the steps of: applying to successive rows at intervals of $2t_s$ a blanking voltage pulse of amplitude $V_B$ and pulse width $2t_s$ followed, after an optimum delay of $n \times t_s$, by a writing voltage pulse of amplitude $V_W$ of width $t_s$ and of opposite polarity to the blanking voltage pulse; and applying to column address lines pairs of bipolar data pulses of amplitude $V_D$ selected from a range including zero, each pulse being of pulse width $t_s$, the data pulses being applied to the column address lines such that the blanking pulse for the ith row coincides with the data pulses and the writing pulse applied to row $i-(n+1)/2$ for odd values of n and to row $i-(n+2)/2$ for even values of n, where i and n are positive integers, $t_s$ is a period of time, and $V_B$, $V_W$ and $V_D$ are voltages.

2. A method as claimed in claim 1, wherein n is an odd integer.

3. A method as claimed in claim 2, wherein n is an odd integer from one to nine.

4. A method as claimed in claim 1, wherein n is an even integer.

5. A method as claimed in claim 4, wherein n is an even integer from zero to ten.

6. A method as claimed in claim 1, including reversing the polarities of the blanking pulse and the writing pulse for alternate frames of operation of the display.

7. A method as claimed in claim 1, including applying an offset dc voltage of magnitude $V_G$ with said blanking and writing pulses such that $V_G=(2V_B-V_W)/N$ where N is an integer equal to the number of rows.

8. A method as claimed in claim 1, wherein the amplitudes $V_D$, $V_B$ and $V_W$ of the data, blanking and writing pulses, respectively, are related by $$4V_D=2V_B=V_W$$

for use in a bilevel display with no grey levels.

9. A method as claimed in claim 1, wherein $V_D$ is variable such that various shades of grey are obtained.

10. Apparatus for driving, in a time-division multiplex mode, a display comprising a matrix of rows and columns of ferroelectric liquid crystal elements, the apparatus comprising means to apply to successive rows of said elements at intervals of $2t_s$ a blanking voltage pulse of amplitude $V_B$ and pulse width $2t_s$ and, after an optimum delay of $n \times t_s$, a writing voltage pulse of amplitude $V_W$, of width $t_s$ and of opposite polarity to the blanking voltage pulse; and means to apply to column address lines pairs of bipolar data pulses of amplitude $V_D$ selected from a range including zero, each pulse being of pulse width $t_s$, such that the blanking pulse for the ith row coincides with the data pulses and the writing pulse applied to row $i-(n+1)/2$ for odd values of n and to row $i-(n+2)/2$ for even values of n, where i and n are positive integers, $t_s$ is a period of time, and $V_B$, $V_W$ and $V_D$ are voltages.

11. Apparatus as claimed in claim 10, comprising means to apply to said ith row with said blanking and writing pulses an offset dc voltage of magnitude $V_G$ such that $$V_G=(2V_B-V_W)/N$$ where N is the number of rows.

12. Apparatus as claimed in claim 10, wherein the means to apply said blanking pulse and said writing pulse is operative to reverse the polarities of said pulses for alternate frames of operation of the display.

* * * * *